(12) United States Patent
Nandiraju

(10) Patent No.: US 11,704,706 B2
(45) Date of Patent: Jul. 18, 2023

(54) GENERATING AN ELECTRONIC CATALOG FOR ONLINE COMPUTER USERS

(71) Applicant: eBay Inc., San Jose, CA (US)

(72) Inventor: Srikanth Nandiraju, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 26 days.

(21) Appl. No.: 16/583,698

(22) Filed: Sep. 26, 2019

(65) Prior Publication Data
US 2020/0286138 A1 Sep. 10, 2020

Related U.S. Application Data

(63) Continuation of application No. 15/162,257, filed on May 23, 2016, now Pat. No. 10,460,365, which is a continuation of application No. 12/277,214, filed on Nov. 24, 2008, now Pat. No. 9,349,143.

(51) Int. Cl.
*G06Q 30/06* (2012.01)
*G06Q 30/0601* (2023.01)
*G06Q 30/08* (2012.01)
*G06Q 30/0241* (2023.01)

(52) U.S. Cl.
CPC ..... *G06Q 30/0603* (2013.01); *G06Q 30/0625* (2013.01); *G06Q 30/0643* (2013.01); *G06Q 30/08* (2013.01); *G06Q 30/0277* (2013.01)

(58) Field of Classification Search
CPC ................................................. G06Q 30/0603
USPC ......................................................... 707/805
See application file for complete search history.

(56) References Cited

U.S. PATENT DOCUMENTS

| | | | |
|---|---|---|---|
| 5,319,542 A | 6/1994 | King, Jr. et al. | |
| 5,860,068 A | 1/1999 | Cook | |
| 5,890,175 A | 3/1999 | Wong et al. | |
| 6,032,130 A | 2/2000 | Alloul et al. | |
| 6,272,495 B1 | 8/2001 | Hetherington | |
| 6,917,922 B1 | 7/2005 | Bezos et al. | |
| 7,082,426 B2 | 7/2006 | Musgrove et al. | |
| 7,610,219 B2 | 10/2009 | Sayed | |

(Continued)

FOREIGN PATENT DOCUMENTS

KR 2001-0111442 A 12/2001

OTHER PUBLICATIONS

U.S. Appl. No. 12/277,214 U.S. Pat. No. 9,349,143, filed Nov. 24, 2008, System and Method for Generating an Electronic Catalog Booklet for Online Computer Users.

(Continued)

*Primary Examiner* — Syling Yen
(74) *Attorney, Agent, or Firm* — Holland & Hart LLP

(57) ABSTRACT

A system and method for generating an electronic catalog booklet for online computer users is disclosed. The system and method in an example embodiment includes providing access to a database of item listings; enabling selection of a plurality of item listings from at least some of the item listings provided in the database; enabling arrangement of the plurality of selected item listings on a plurality of pages in a computer-generated electronic catalog booklet; recording an identifier of the computer-generated electronic catalog booklet; and recording information associating each of the plurality of selected item listings with the identifier of the computer-generated electronic catalog booklet.

18 Claims, 9 Drawing Sheets

(56) References Cited

U.S. PATENT DOCUMENTS

| | | | |
|---|---|---|---|
| 7,716,089 | B1 | 5/2010 | Gavarini |
| 7,970,665 | B1 | 6/2011 | Lifson |
| 8,121,902 | B1 | 2/2012 | Desjardins et al. |
| 8,122,020 | B1 | 2/2012 | Donsbach et al. |
| 8,612,449 | B1 | 12/2013 | Cuthbert |
| 8,892,506 | B2 | 11/2014 | Round et al. |
| 9,349,143 | B2 | 5/2016 | Nandiraju |
| 9,760,904 | B2 | 9/2017 | Hassan |
| 10,402,848 | B2 | 9/2019 | Hassan |
| 10,460,365 | B2 | 10/2019 | Nandiraju |
| 10,891,661 | B2* | 1/2021 | Bonzi ............... H04L 67/02 |
| 2002/0055891 | A1 | 5/2002 | Yang |
| 2002/0085025 | A1* | 7/2002 | Busis ............... G06Q 30/06 715/738 |
| 2002/0103789 | A1* | 8/2002 | Turnbull ............... G06F 16/9535 |
| 2003/0028451 | A1 | 2/2003 | Ananian |
| 2003/0083961 | A1 | 5/2003 | Bezos et al. |
| 2003/0139976 | A1 | 7/2003 | Hanai et al. |
| 2003/0160824 | A1* | 8/2003 | Szumla ............... G06T 11/60 715/769 |
| 2003/0167213 | A1 | 9/2003 | Jammes et al. |
| 2004/0030615 | A1 | 2/2004 | Ling |
| 2004/0059645 | A1 | 3/2004 | Wirth |
| 2004/0199575 | A1 | 10/2004 | Geller |
| 2005/0027619 | A1 | 2/2005 | Basak et al. |
| 2005/0055420 | A1* | 3/2005 | Wyler ............... G06F 16/9577 709/217 |
| 2005/0060324 | A1 | 3/2005 | Johnson et al. |
| 2005/0246627 | A1 | 11/2005 | Sayed |
| 2007/0106570 | A1 | 5/2007 | Hartman et al. |
| 2007/0282693 | A1 | 12/2007 | Staib et al. |
| 2008/0077507 | A1 | 3/2008 | McElhiney et al. |
| 2008/0109327 | A1 | 5/2008 | Mayle et al. |
| 2008/0154632 | A1 | 6/2008 | Jacobi et al. |
| 2009/0012991 | A1 | 1/2009 | Johnson et al. |
| 2009/0132388 | A1* | 5/2009 | Omori ............... G06F 16/26 705/26.1 |
| 2010/0131492 | A1 | 5/2010 | Nandiraju |
| 2010/0191582 | A1* | 7/2010 | Dicker ............... G06Q 30/0633 705/14.51 |
| 2010/0217684 | A1 | 8/2010 | Melcher et al. |
| 2011/0060645 | A1 | 3/2011 | Sweeney |
| 2011/0231291 | A1 | 9/2011 | Yankovich et al. |
| 2012/0203675 | A1 | 8/2012 | Hassan |
| 2016/0267559 | A1 | 9/2016 | Nandiraju |
| 2017/0372342 | A1 | 12/2017 | Hassan |
| 2019/0295117 | A1 | 9/2019 | Hassan |

OTHER PUBLICATIONS

U.S. Appl. No. 15/162,257 U.S. Pat. No. 10,460,365, filed May 23, 2016, Generating an Electronic Catalog for Online Computer Users (as amended).
U.S. Appl. No. 13/367,564 U.S. Pat. No. 9,760,904, filed Feb. 7, 2012, System and Method for Generating an Electronic Catalog for Online Computer Users.
U.S. Appl. No. 15/700,753, filed Sep. 11, 2017, System and Method for Generating an Electronic Catalog for Online Computer Users.
Advisory Action Received for U.S. Appl. No. 12/277,214 dated Aug. 10, 2015, 3 pages.
Advisory Action received for U.S. Appl. No. 12/277,214, dated Mar. 15, 2013, 3 pages.
Applicant Interview Summary received for U.S. Appl. No. 12/277,214, dated Jul. 15, 2015, 3 pages.
Final Office Action received for U.S. Appl. No. 12/277,214, dated Apr. 4, 2014, 21 pages.
Final Office Action received for U.S. Appl. No. 12/277,214, dated Dec. 28, 2012, 22 pages.
Final Office Action received for U.S. Appl. No. 12/277,214, dated Jul. 15, 2011, 14 pages.
Final Office Action received for U.S. Appl. No. 12/277,214, dated May 28, 2015, 31 pages.
Non-Final Office Action received for U.S. Appl. No. 12/277,214, dated Dec. 21, 2010, 13 pages.
Non-Final Office Action received for U.S. Appl. No. 12/277,214, dated Jan. 9, 2015, 24 pages.
Non-Final Office Action received for U.S. Appl. No. 12/277,214, dated Jul. 25, 2012, 18 pages.
Non-Final Office Action received for U.S. Appl. No. 12/277,214, dated Nov. 5, 2013, 21 pages.
Notice of Allowance received for U.S. Appl. No. 12/277,214, dated Feb. 1, 2016, 13 pages.
Response to Advisory Action filed on Mar. 28, 2013, for U.S. Appl. No. 12/277,214, dated Mar. 15, 2013, 10 pages.
Response to Final Office Action filed on Dec. 14, 2011, for U.S. Appl. No. 12/277,214, dated Jul. 15, 2011, 10 pages.
Response to Final Office Action filed on Feb. 27, 2013, for U.S. Appl. No. 12/277,214, dated Dec. 28, 2012, 12 pages.
Response to Final Office Action filed on Jul. 7, 2014, for U.S. Appl. No. 12/277,214, dated Apr. 4, 2014, 10 pages.
Response to Final Office Action filed on Jul. 28, 2015, for U.S. Appl. No. 12/277,214, dated May 28, 2015, 10 pages.
Response to Non-Final Office Action filed on Mar. 5, 2014, for U.S. Appl. No. 12/277,214, dated Nov. 5, 2013, 15 pages.
Response to Non-Final Office Action filed on May 11, 2015, for U.S. Appl. No. 12/277,214, dated Jan. 9, 2015, 13 pages.
Response to Non-Final Office Action filed on May 23, 2011, for U.S. Appl. No. 12/277,214, dated Dec. 21, 2010, 10 pages.
Response to Non-Final Office Action filed on Nov. 26, 2012, for U.S. Appl. No. 12/277,214, dated Jul. 25, 2012, 8 pages.
Applicant Initiated Interview Summary received for U.S. Appl. No. 13/367,564, dated Jun. 10, 2014, 3 pages.
Applicant Initiated Interview Summary received for U.S. Appl. No. 13/367,564, dated Mar. 16, 2016, 3 pages.
Applicant Initiated Interview Summary received for U.S. Appl. No. 13/367,564, dated Oct. 27, 2014, 3 pages.
Final Office Action received for U.S. Appl. No. 13/367,564, dated Jun. 21, 2016, 27 pages.
Final Office Action received for U.S. Appl. No. 13/367,564, dated Mar. 12, 2015, 13 pages.
Non-Final Office Action received for U.S. Appl. No. 13/367,564, dated Apr. 11, 2014, 11 pages.
Non-Final Office Action received for U.S. Appl. No. 13/367,564, dated Feb. 5, 2016, 26 pages.
Non-Final Office Action received for U.S. Appl. No. 13/367,564 dated Sep. 8, 2014, 13 pages.
Notice of Allowance Received for U.S. Appl. No. 13/367,564 dated May 5, 2017, 7 pages.
Response to Final Office Action filed on Jun. 12, 2015, for U.S. Appl. No. 13/367,564, dated Mar. 12, 2015, 30 pages.
Response to Final Office Action filed on Oct. 21, 2016, for U.S. Appl. No. 13/367,564, dated Jun. 21, 2016, 19 pages.
Response to Non-Final Office Action filed on Jul. 11, 2014, for U.S. Appl. No. 13/367,564, dated Apr. 11, 2014, 19 pages.
Response to Non-Final Office Action filed on Dec. 8, 2014 for U.S. Appl. No. 13/367,564, dated Sep. 8, 2014, 14 pages.
Response to Non-Final Office Action filed on Jun. 6, 2016, for U.S. Appl. No. 13/367,564 dated Feb. 5, 2016, 15 pages.
Final Office Action received for U.S. Appl. No. 15/162,257, dated Jun. 20, 2018, 20 pages.
Non-Final Office Action received for U.S. Appl. No. 15/162,257, dated Dec. 15, 2017, 24 pages.
Notice of Allowance received for U.S. Appl. No. 15/162,257, dated Jun. 19, 2019, 5 pages.
Preliminary Amendment filed for U.S. Appl. No. 15/162,257, dated Jun. 15, 2016, 9 pages.
Response to Final Office Action filed on Sep. 20, 2018, for U.S. Appl. No. 15/162,257, dated Jun. 20, 2018, 12 pages.
Response to Non-Final Office Action filed on Apr. 20, 2018 for U.S. Appl. No. 15/162,257 dated Dec. 15, 2017, 15 pages.
Applicant Initiated Interview Summary received for U.S. Appl. No. 15/700,753, dated Jan. 31, 2019, 3 pages.
Non-Final Office Action received for U.S. Appl. No. 15/700,753, dated Jan. 11, 2019, 9 pages.

(56) References Cited

OTHER PUBLICATIONS

Notice of Allowance Received for U.S. Appl. No. 15/700,753 dated Apr. 18, 2019, 6 pages.
Preliminary Amendment for U.S. Appl. No. 15/700,753, filed Oct. 19, 2017, 8 pages.
Response to Non-Final Office Action filed on Mar. 11, 2019, for U.S. Appl. No. 15/700,753, dated Jan. 11, 2019, 12 pages.
Amazon, "Amazon.com", Sep. 28, 2018, 5 pages.
Preliminary Amendment filed for U.S. Appl. No. 16/442,157, dated Mar. 16, 2020, 7 pages.
Clayton, How to Build a Sales Catalog, Oct. 15, 2009, https://smallbusiness.chron.com/, https://smallbusiness.chron.com/ build-sales-catalog-22697.html (Year: 2009), 10 pages.
Non-Final Office Action received for U.S. Appl. No. 16/442,157 dated Jul. 1, 2022, 27 pages.
Final Office Action Received for U.S. Appl. No. 16/442,157, dated Nov. 14, 2022, 30 pages.
Non-Final Office Action Received for U.S. Appl. No. 16/442,157, dated Feb. 6, 2023, 34 pages.

\* cited by examiner

GENERATING AN ELECTRONIC CATALOG FOR ONLINE COMPUTER USERS

PRIORITY CLAIM

This patent application is a continuation of U.S. patent application Ser. No. 15/162,257, filed May 23, 2016, which is a continuation of U.S. patent application Ser. No. 12/277, 214, filed Nov. 24, 2008, each of which is hereby incorporated by reference in its entirety.

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc., All Rights Reserved.

TECHNICAL FIELD

This disclosure relates to methods and systems supporting computing and data processing systems. More particularly, a system and method for generating an electronic catalog booklet for online computer users is described.

RELATED ART

Conventional systems, like Amazon.com, can display a listing of items for purchase by online shoppers. However, these item listings are typically arranged in one of several sorting orders provided by the host site. Some existing systems can also categorize items into groups or categories based on the host system's determination of relatedness between the characteristics of the items for sale. However, sometimes a host site's determination of item relatedness may not suit a particular user. Some users may wish to group items in arbitrary ways that the host site did not consider.

U.S. Pat. No. 6,032,130 describes a multimedia product catalog and electronic purchasing system that provides multimedia product presentations in real-time, by combining locally-stored data and data received from a remote server. Large volumes of data, representing product information such as motion images and sound, are stored locally on the system's data storing unit for fast data access. Small volumes of product time-variable data are received over a network from a remote server, which also has a transaction management function. The purchasing system is a PC-based purchasing system, equipped with multimedia capabilities. It uses a purchasing application which is distributed beside the large volumes of product-related data on a portable support such as a CD-ROM.

U.S. Pat. No. 7,082,426 describes a method for processing plural product information records from the product information sources into one or more groups based on which product information records are likely to correspond to the same product, correlating a unique product ID corresponding to the product associated with each of said groups to identify the product, comparing each identified product to categories of a taxonomy to determine a category for the identified products in the taxonomy, and determining attributes for each categorized product based on the product information records corresponding to each group, creating product specifications based on the determined attributes and storing the product specification in the corresponding determined categories of the taxonomy.

Thus, a system and method for generating an electronic catalog booklet for online computer users are needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the various embodiments described herein may be practiced without these specific details. According to various example embodiments described herein, there is provided a system and method for generating an electronic catalog booklet for online computer users that provides a new method for browsing various item groupings (e.g., items listings from the eBay website).

Figure 1:
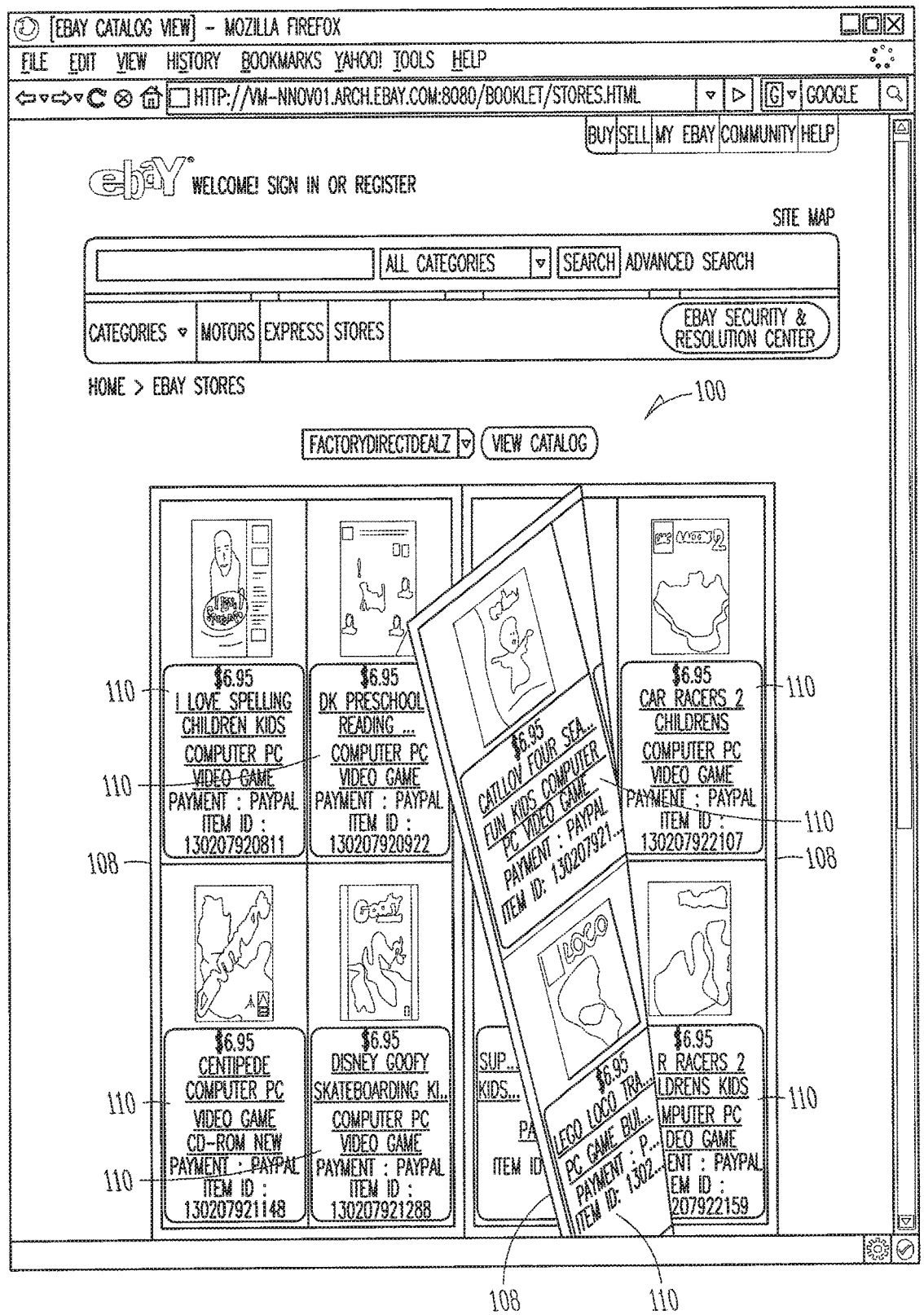
FIG. 1 illustrates a particular example embodiment of an electronic catalog booklet for online computer users.

FIG. 1 illustrates a particular example embodiment of an electronic catalog booklet for online computer users. As shown in FIG. 1, an electronic catalog 100 is displayed within a conventional display screen window 105 on a computer system of a client user. As described in more detail below, the client system may be connected or connectable to a server computer system via a conventional data network, such as the Internet. The client system can use conventional hardware and operating system software to display and manipulate window 105.

The electronic catalog 100 is created using the functionality of various embodiments described herein. The electronic catalog 100 is comprised of a plurality of electronic pages 108 on which a plurality of item listings 110 from an item database are displayed. As described in more detail below, the information used to generate the plurality of item listings 110 resides in an item database. The items retained in the database are typically items (e.g. products or services) offered for sale, bid, lease, rent or trial. Using conventional systems, networked users can create item listings for storage in the database.

A particular embodiment enables a user to search the item database for item listings of interest, to select a set of item listings, and to transfer an instance of the selected item listings into a desired position on a page of the electronic catalog 100. As shown in the example of FIG. 1, the electronic catalog 100 has been populated with a plurality of item listings 110. The functionality of a particular embodiment for creating an electronic catalog 100 is described in more detail below.

The electronic catalog 100 enables a user/shopper to view a particular collection of item listings 110 as compiled by a creator of the electronic catalog 100. Using soft buttons or particular pointing device or finger movements, the user can turn the electronic pages 108 of the electronic catalog 100 to reveal a new set of item listings 110 on subsequent pages. In this manner, a user can scan through the particular collection of item listings 110 as arranged and ordered by the creator of the electronic catalog 100. Each item listing 110 can be a fixed size and shape or each listing 110 can be resized and reshaped by the creator of the electronic catalog 100 when the catalog 100 is created. Each item listing 110 can include a description of a corresponding item for sale, bid, lease, rent or trial. Each item listing 110 can optionally include an image corresponding to the item. Each item listing 110 can also include a hyperlink, email button, or call button with which a user/shopper can purchase the corresponding item or otherwise obtain more information on the item.

When the electronic catalog 100 is created, as described below, the electronic catalog 100 can be uniquely identified with a name, number, or code. This unique identifier enables each particular catalog 100 to be distinguished from other catalogs 100. Catalog descriptive information related to the author, date of creation, expiration date, topic/category, affiliation, etc. can also be recorded for the catalog 100. Further, each page of the electronic catalog 100 can be internally marked with a unique identifier to distinguish each page of a particular electronic catalog 100. The identifier of each page in the computer-generated electronic catalog booklet 100 can be recorded with information associating each of the plurality of selected item listings with the identifier of the corresponding page on which the item listing appears in the electronic catalog 100. Additionally, the position on the page where the item listing appears can also be recorded as part of the information retained for the particular electronic catalog 100. In this manner, information retained for a particular electronic catalog 100 can include an identifier of the catalog, descriptive information related to the catalog, identifiers for each of the pages in the catalog, identifiers for each of the item listings in the catalog, information associating item listings with the page where the item listings appear, and information associating item listings with the page positions where the item listings appear. It will be apparent to those of ordinary skill in the art that other information associated with a particular electronic catalog 100 can also be retained.

Figure 2:
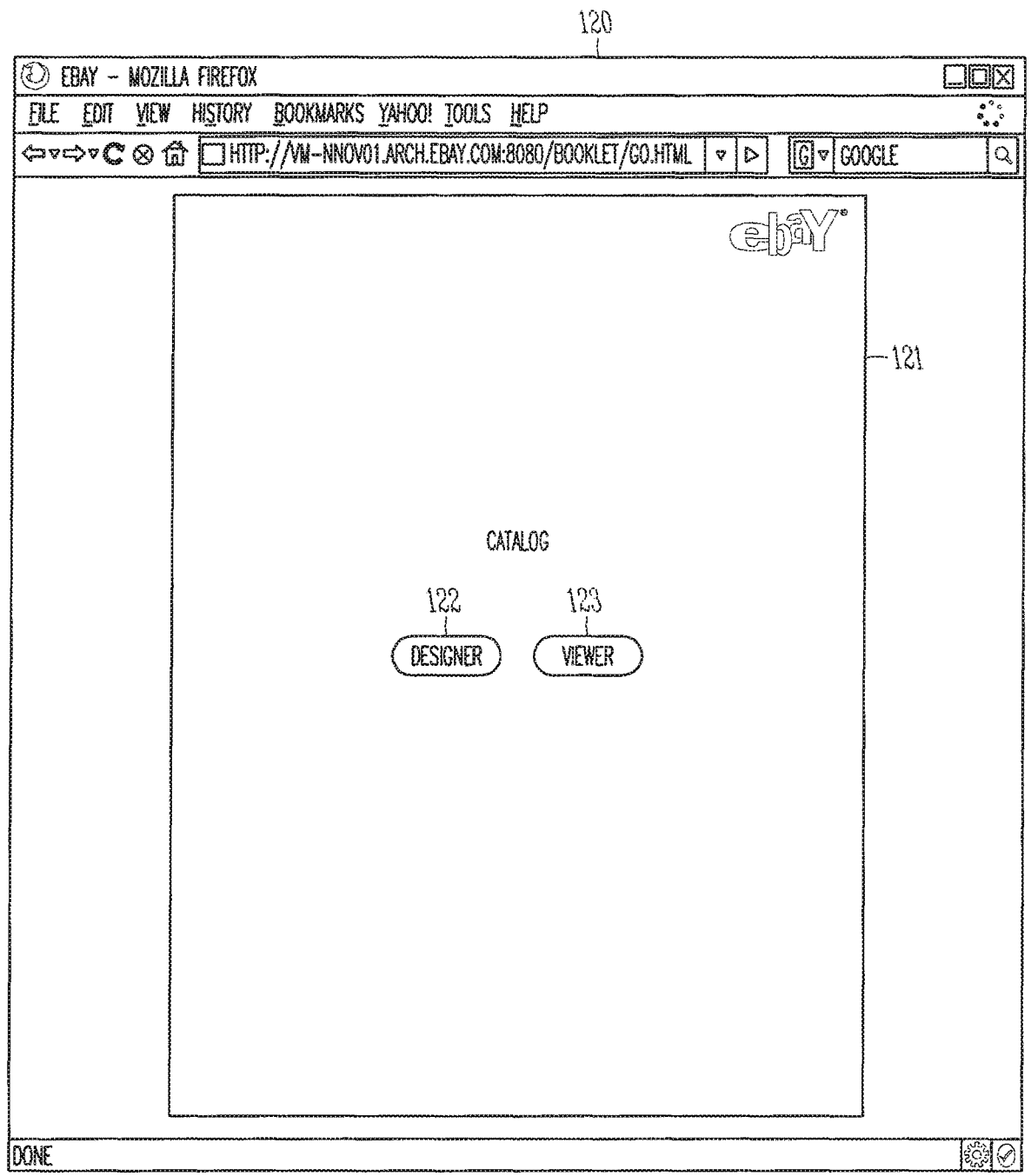
FIG. 2 illustrates an example embodiment of the initial user interface screen for creating or viewing an electronic catalog booklet for online computer users, shown in a particular configuration.
Figure 3:
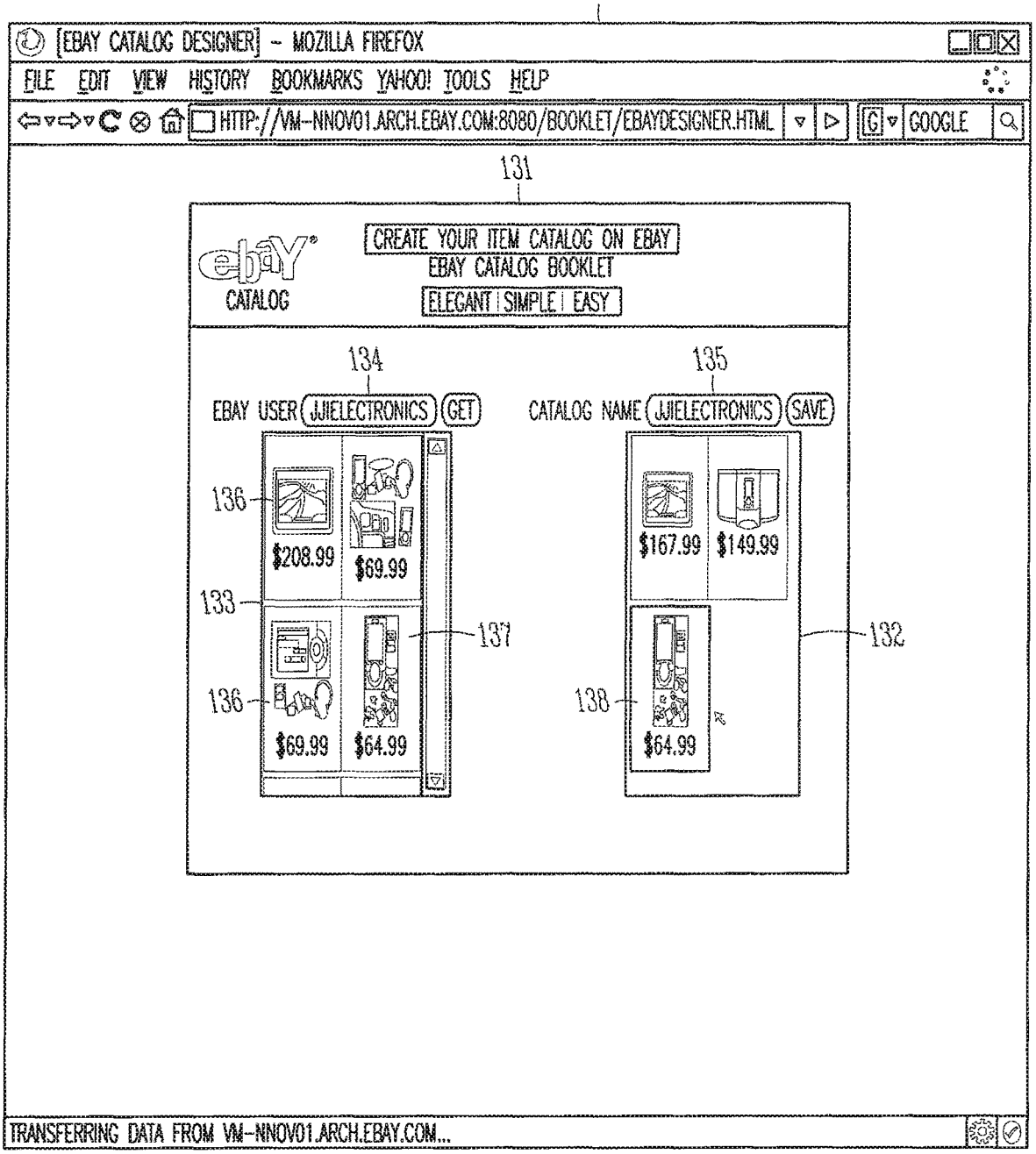
FIG. 3 illustrates an example embodiment of the user interface screen for creating an electronic catalog booklet for online computer users.

FIG. 2 illustrates an example embodiment of the initial user interface screen for creating or viewing an electronic catalog booklet for online computer users, shown in a particular configuration. In a particular embodiment, the initial user interface screen 121 is shown in a window 120 when a user activates a software application. The initial user interface screen 121 provides soft buttons 122 and 123 with which a user can either create a new electronic catalog (button 122) or view an existing catalog (button 123). If the user clicks on the button 122 to create a new electronic catalog, a particular example embodiment presents the electronic catalog authoring/creation screen 131 in window 130 to the user as shown in FIG. 3. If the user clicks on the button 123 to view an existing catalog, a particular example embodiment presents the selected electronic catalog 100 to the user as shown in FIGS. 4 and 5.

FIG. 3 illustrates an example embodiment of the user interface screen 131 for authoring/creating an electronic catalog booklet for online computer users. In a particular embodiment, the electronic catalog authoring/creation screen 131 includes two main display areas 132 and 133. Display area 133 represents a set of item listings produces as a result of a search performed on the item database. Using conventional searching techniques, a user can search the item database for particular item listings of interest. A search query can be entered in search field 134 and a portion of the matching item listings 136 and 137 is presented in the display area 133. A slider bar can be used to scroll the matching item listings. In the particular example shown in FIG. 3, the user has selected item listing 137 for inclusion in the newly created electronic catalog. The user can use a conventional pointing device (e.g. mouse) to drag the selected item listing to the display area 132. Display area 132 represents a page of the newly created electronic catalog. As shown by the item listing 138 shown in FIG. 3, the user can drag and drop the selected item listing from the item database search result display area 133 to the page 132 of the newly created electronic catalog. Upon completion of this drag and drop process of a particular embodiment, identifiers for each of the item listings dragged into the new catalog, information associating item listings with the page where the item listings are dropped, and information associating item listings with the page positions where the item listings appear can be retained. Additionally, the user can create an identifier of the catalog in field 135 and the user may enter descriptive information related to the catalog. The system can also create identifiers for each of the pages in the newly created catalog. The user can populate a plurality of pages in the newly created catalog using the drag and drop process described above. Additionally, the user can remove or rearrange item listings in page area 132 once the item listings have been dropped in this area. The user can also resize or reshape item listings in page area 132 by placing a pointing device cursor on an edge of the particular item listing display object and dragging the item listing display object into the desired size and shape within page area 132.

Figure 4:
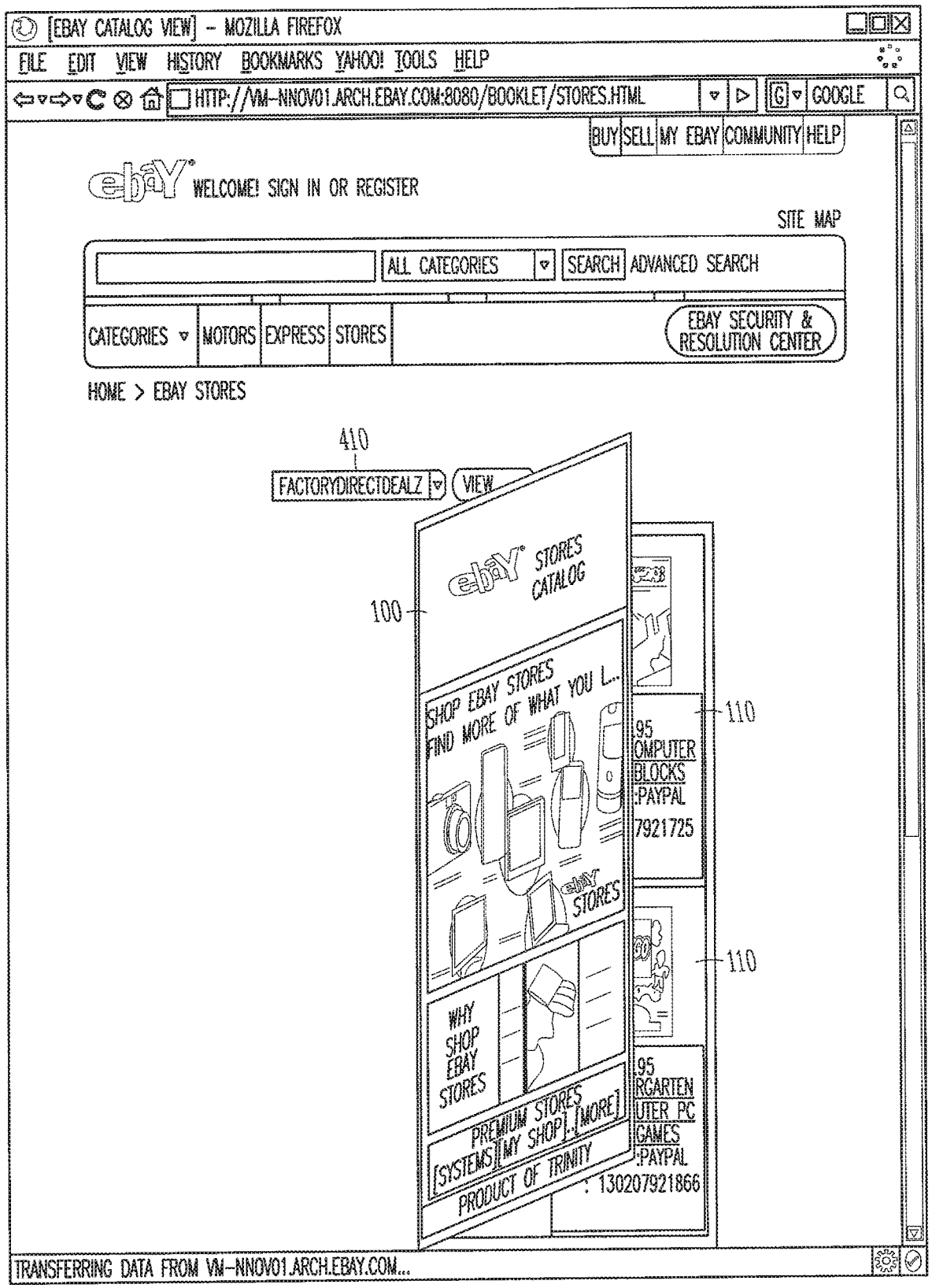
FIG. 4 illustrates an example embodiment of the user interface screen for viewing an electronic catalog booklet for online computer users, shown in a particular configuration.

FIG. 4 illustrates an example embodiment of the user interface screen for viewing an electronic catalog booklet 100 for online computer users. Using the text entry field or drop down selection object 410, a user can select a desired electronic catalog for viewing. Upon selection of the desired electronic catalog, the catalog 100 is displayed as shown for the example in FIG. 4. The catalog 100 can include a cover or cover page, which can be created by the user and merged into the electronic catalog 100 as a JPEG, GIF, or other image format. Using soft buttons or particular pointing device or finger movements, the user can turn the electronic pages of the electronic catalog 100 to reveal pages of item listings 110 on subsequent pages. In this manner, a user can scan through the particular collection of item listings 110 as arranged and ordered by the creator of the electronic catalog 100.

Figure 5:
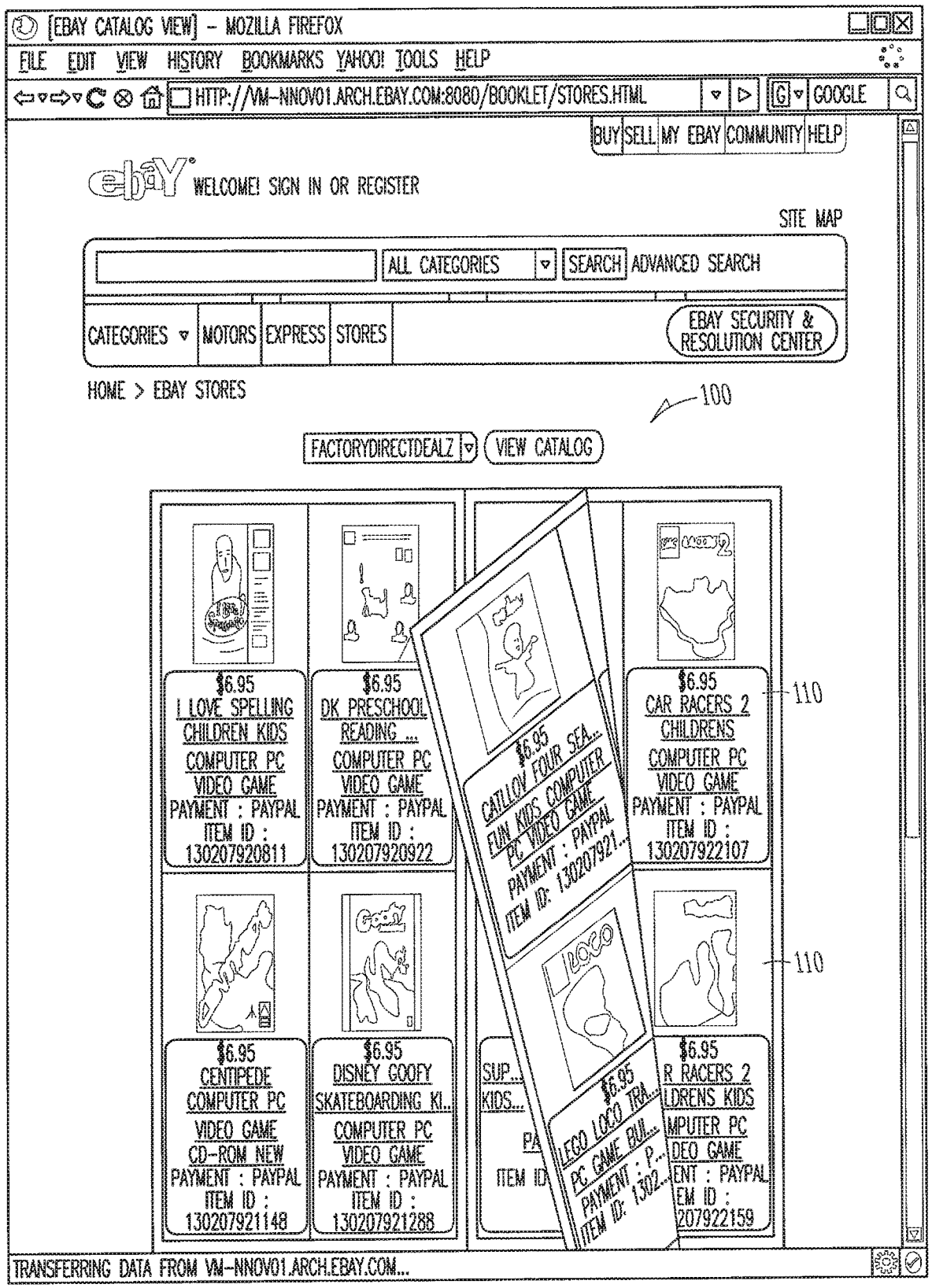
FIG. 5 illustrates another particular example embodiment of an electronic catalog booklet for online computer users.

FIG. 5 illustrates another particular example embodiment of an electronic catalog booklet for online computer users. As shown, the pages of catalog 100 can be turned using soft buttons or cursor movements to reveal pages of item listings 110 on subsequent pages. The item listings 110 on each page of the catalog 100 can include a description of a corresponding item for sale, bid, lease, rent or trial. Each item listing 110 can optionally include an image corresponding to the item. Each item listing 110 can also include a hyperlink, email button, or call button with which a user/shopper can purchase the corresponding item or otherwise obtain more information on the item. The catalog 100 can be viewed by any user via the network who has been given access to the catalog 100.

The electronic catalogs 100 of various embodiments can be made available to other users by installing a link or widget on a webpage that can be used to activate a particular electronic catalog 100 for viewing. Electronic catalogs 100 of various embodiments can also be made available to other users by email or other electronic document transfer medium. In this manner, catalog creators can create and publish particular catalogs having particular collections of item listings. Catalog creators can also provide catalogs to affiliates or affiliate programs who can make catalogs available to other users. The catalog descriptive information enables affiliates to credit catalog creators when a particular catalog causes an item listing to be converted to a sale, bid, lease, rent or trial of the corresponding item. In this manner, catalog creators who create an attractive collection of item listings in a particular electronic catalog can be rewarded.

Example Process Flow

Figure 6:
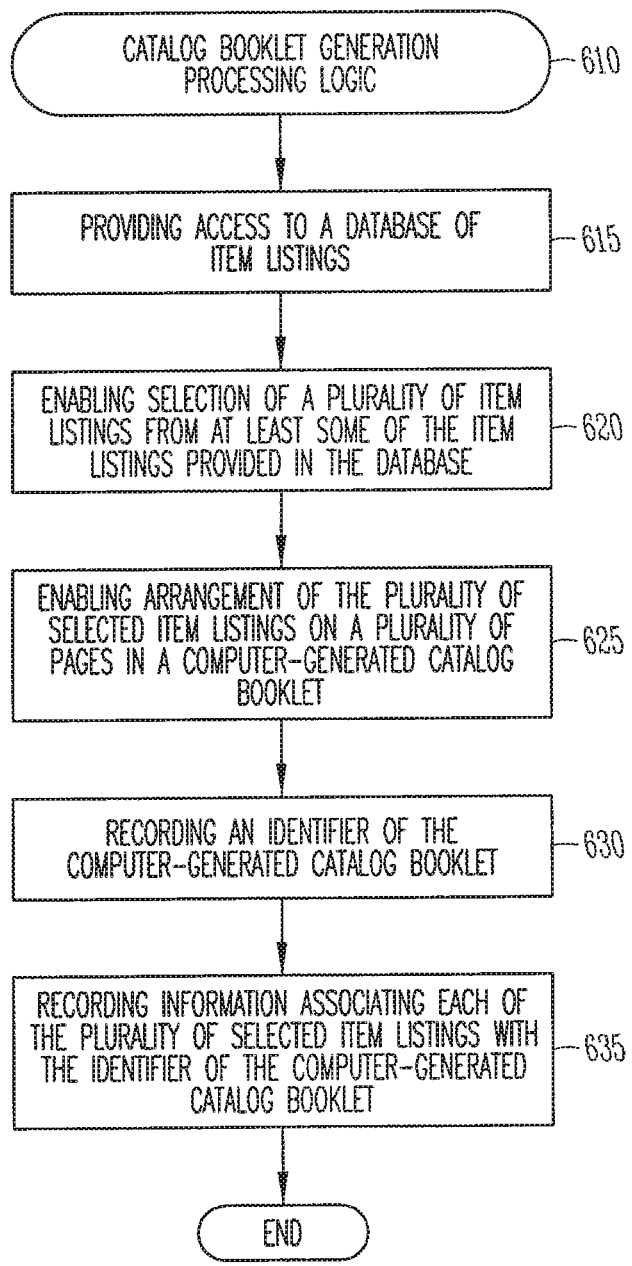
FIG. 6 illustrates a processing flow diagram for an example embodiment.

Referring to FIG. 6, a processing flow for generating an electronic catalog booklet for online computer users in an example embodiment is shown. The method of an example embodiment includes: providing access to a database of item listings (processing block 615); enabling selection of a plurality of item listings from at least some of the item listings provided in the database (processing block 620); enabling arrangement of the plurality of selected item listings on a plurality of pages in a computer-generated electronic catalog booklet (processing block 625); recording an identifier of the computer-generated electronic catalog booklet (processing block 630); and recording information associating each of the plurality of selected item listings with the identifier of the computer-generated electronic catalog booklet (processing block 635).

Figure 7:
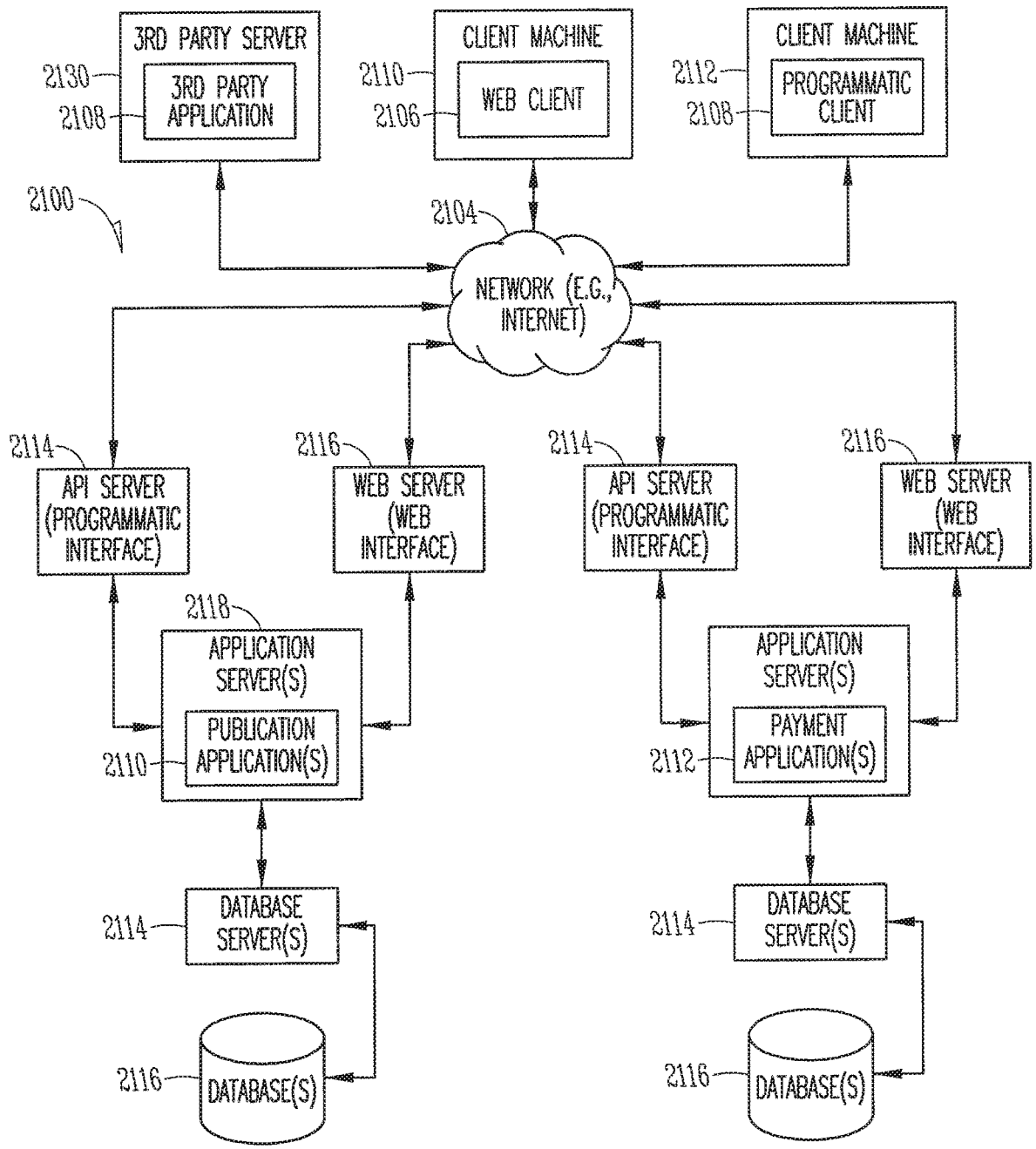
FIG. 7 is a network diagram depicting a client-server system, within which one example embodiment may be deployed.

FIG. 7 is a network diagram depicting a client-server system 2100, within which one example embodiment may be deployed. A networked system 2100, in the example forms of a network-based marketplace or publication system, provides server-side functionality, via a network 2104 (e.g., the Internet or Wide Area Network (WAN)) to one or more clients. FIG. 7 illustrates, for example, a web client 2106 (e.g., a browser, such as the Internet Explorer browser developed by Microsoft Corporation of Redmond, Wash. State), and a programmatic client 2108 executing on respective client machines 2110 and 2112.

An Application Program Interface (API) server 2114 and a web server 2116 are coupled to, and provide programmatic and web interfaces respectively to, one or more application servers 2118. The application servers 2118 host one or more marketplace applications 2110 and payment applications 2112. The application servers 2118 are, in turn, shown to be coupled to one or more databases servers 2114 that facilitate access to one or more databases 21216.

The marketplace applications 2110 may provide a number of marketplace functions and services to users that access the networked system 2100. The payment applications 2112 may likewise provide a number of payment services and functions to users. The payment applications 2112 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2110. While the marketplace and payment applications 2110 and 2112 are shown in FIG. 7 to both form part of the networked system 2100 it will be appreciated that, in alternative embodiments, the payment applications 2112 may form part of a payment service that is separate and distinct from the networked system 2100.

Further, while the system 2100 shown in FIG. 7 employs a client-server architecture, the present invention is of course not limited to such an architecture, and may equally well find application in a distributed, or peer-to-peer, architecture system, for example. The various marketplace and payment applications 2110 and 2112 may also be implemented as standalone software programs, which do not necessarily have networking capabilities.

The web client 2106 accesses the various marketplace and payment applications 2110 and 2112 via the web interface supported by the web server 2116. Similarly, the programmatic client 2108 accesses the various services and functions provided by the marketplace and payment applications via the programmatic interface provided by the API server 2114. The programmatic client 2108 may, for example, be a seller application (e.g., the TurboLister application developed by eBay Inc., of San Jose, Calif.) to enable sellers to author and manage listings on the networked system 2100 in an off-line manner, and to perform batch-mode communications between the programmatic client 2108 and the networked system 2100.

FIG. 7 also illustrates a third party application 2118, executing on a third party server machine 2130, as having programmatic access to the networked system via the programmatic interface provided by the API server. For example, the third party application may, utilizing information retrieved from the networked system, support one or more features or functions on a website hosted by the third party. The third party website may, for example, provide one or more promotional, marketplace or payment functions that are supported by the relevant applications of the networked system.

Figure 8:
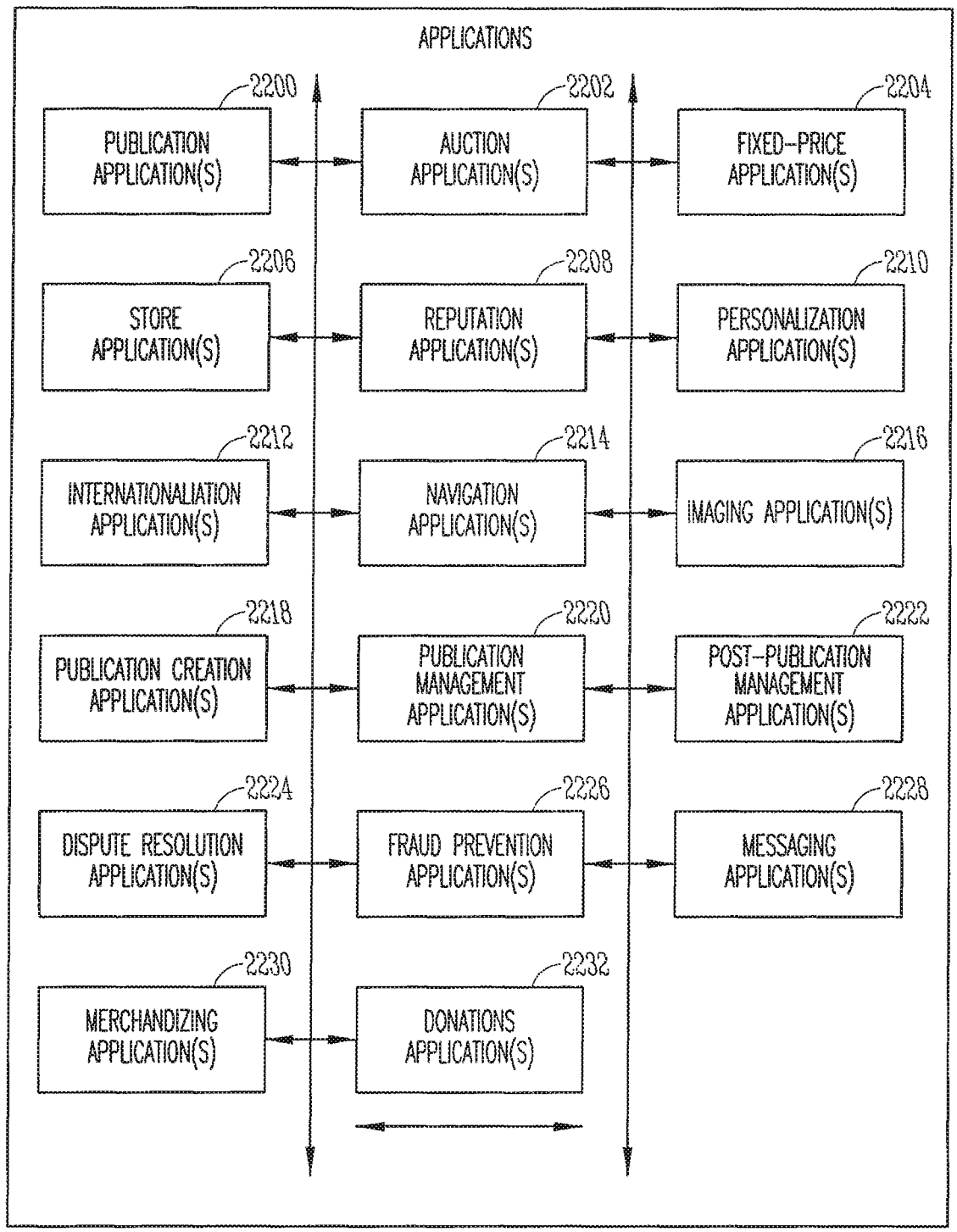
FIG. 8 is a block diagram illustrating multiple applications and that, in one example embodiment, are provided as part of the networked system.

FIG. 8 is a block diagram illustrating multiple applications and that, in one example embodiment, are provided as part of the networked system. The applications may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases via the database servers.

The networked system may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications are shown to include at least one publication application 2200 and one or more auction applications 2202 which support auction-format listing and price setting mechanisms (e.g., English, Dutch, Vickrey, Chinese, Double, Reverse auctions etc.). The various auction applications 2202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2206 allow a seller to group listings within a "virtual" store, which may be branded and otherwise personalized by and for the seller. Such a virtual store may also offer promotions, incentives and features that are specific and personalized to a relevant seller.

Reputation applications 2208 allow users that transact, utilizing the networked system, to establish, build and maintain reputations, which may be made available and published to potential trading partners. Consider that where, for example, the networked system supports person-to-person trading, users may otherwise have no history or other reference information whereby the trustworthiness and credibility of potential trading partners may be assessed. The reputation applications 2208 allow a user, for example through feedback provided by other transaction partners, to establish a reputation within the networked system 21021 over time. Other potential trading partners may then reference such a reputation for the purposes of assessing credibility and trustworthiness.

Personalization applications 2210 allow users of the networked system to personalize various aspects of their interactions with the networked system. For example a user may, utilizing an appropriate personalization application 2210, create a personalized reference page at which information regarding transactions to which the user is (or has been) a party may be viewed. Further, a personalization application 2210 may enable a user to personalize listings and other aspects of their interactions with the networked system and other parties.

The networked system may support a number of marketplaces that are customized, for example, for specific geographic regions. A version of the networked system may be customized for the United Kingdom, whereas another version of the networked system may be customized for the United States. Each of these versions may operate as an independent marketplace, or may be customized (or internationalized) presentations of a common underlying marketplace. The networked system may accordingly include a number of internationalization applications 2212 that customize information (and/or the presentation of information) by the networked system according to predetermined criteria (e.g., geographic, demographic or marketplace criteria). For example, the internationalization applications 2212 may be used to support the customization of information for a number of regional websites that are operated by the networked system and that are accessible via respective web servers.

Navigation of the networked system may be facilitated by one or more navigation applications 2214. For example, a search application (as an example of a navigation application) may enable key word searches of listings published via the networked system. A browse application may allow users to browse various category, catalogue, or inventory data structures according to which listings may be classified within the networked system. Various other navigation applications may be provided to supplement the search and browsing applications.

In order to make listings, available via the networked system, as visually informing and attractive as possible, the marketplace applications may include one or more imaging applications 2216 utilizing which users may upload images for inclusion within listings. An imaging application 2216 also operates to incorporate images within viewed listings. The imaging applications 2216 may also support one or more promotional features, such as image galleries that are presented to potential buyers. For example, sellers may pay an additional fee to have an image included within a gallery of images for promoted items.

Listing creation applications 2218 allow sellers conveniently to author listings pertaining to goods or services that they wish to transact via the networked system, and listing management applications 2220 allow sellers to manage such listings. Specifically, where a particular seller has authored and/or published a large number of listings, the management of such listings may present a challenge. The listing management applications 2220 provide a number of features (e.g., auto-relisting, inventory level monitors, etc.) to assist the seller in managing such listings. One or more post-listing management applications 2222 also assist sellers with a number of activities that typically occur post-listing. For example, upon completion of an auction facilitated by one or more auction applications 2202, a seller may wish to leave feedback regarding a particular buyer. To this end, a post-listing management application 2222 may provide an interface to one or more reputation applications 2208, so as to allow the seller conveniently to provide feedback regarding multiple buyers to the reputation applications 2208.

Dispute resolution applications 2224 provide mechanisms whereby disputes arising between transacting parties may be resolved. For example, the dispute resolution applications 2224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 2226 implement fraud detection and prevention mechanisms to reduce the occurrence of fraud.

Messaging applications 2228 are responsible for the generation and delivery of messages to users of the networked system, such messages for example advising users regarding the status of listings at the networked system (e.g., providing "outbid" notices to bidders during an auction process or to provide promotional and merchandising information to users). Respective messaging applications 2228 may utilize any one have a number of message delivery networks and platforms to deliver messages to users. For example, messaging applications 2228 may deliver electronic mail (e-mail), instant message (IM), Short Message Service (SMS), text, facsimile, or voice (e.g., Voice over IP (VoIP))

messages via the wired (e.g., the Internet), Plain Old Telephone Service (POTS), or wireless (e.g., mobile, cellular, WiFi, WiMAX) networks.

Merchandising applications 2230 support various merchandising functions that are made available to sellers to enable sellers to increase sales via the networked system. The merchandising applications 2230 also operate the various merchandising features that may be invoked by sellers, and may monitor and track the success of merchandising strategies employed by sellers.

The networked system itself, or one or more parties that transact via the networked system, may operate loyalty programs that are supported by one or more loyalty/promotions applications. For example, a buyer may earn loyalty or promotions points for each transaction established and/or concluded with a particular seller, and be offered a reward for which accumulated loyalty points can be redeemed.

Various tables that may be maintained within the databases, and that are utilized by and support the applications. A user table contains a record for each registered user of the networked system, and may include identifier, address and financial instrument information pertaining to each such registered user. A user may operate as a seller, a buyer, or both, within the networked system. In one example embodiment, a buyer may be a user that has accumulated value (e.g., commercial or proprietary currency), and is accordingly able to exchange the accumulated value for items that are offered for sale by the networked system.

The tables also include an items table in which are maintained item records for goods and services that are available to be, or have been, transacted via the networked system. Each item record within the items table may furthermore be linked to one or more user records within the user table, so as to associate a seller and one or more actual or potential buyers with each item record.

A transaction table contains a record for each transaction (e.g., a purchase or sale transaction) pertaining to items for which records exist within the items table.

An order table is populated with order records, each order record being associated with an order. Each order, in turn, may be with respect to one or more transactions for which records exist within the transaction table.

Bid records within a bids table each relate to a bid received at the networked system in connection with an auction-format listing supported by an auction application 2202. A feedback table is utilized by one or more reputation applications 2208, in one example embodiment, to construct and maintain reputation information concerning users. A history table maintains a history of transactions to which a user has been a party. One or more attributes tables record attribute information pertaining to items for which records exist within the items table. Considering only a single example of such an attribute, the attributes tables may indicate a currency attribute associated with a particular item, the currency attribute identifying the currency of a price for the relevant item as specified in by a seller.

Modules, Components and Logic

Certain embodiments are described herein as including logic or a number of components, modules, or mechanisms. A component is tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 9:
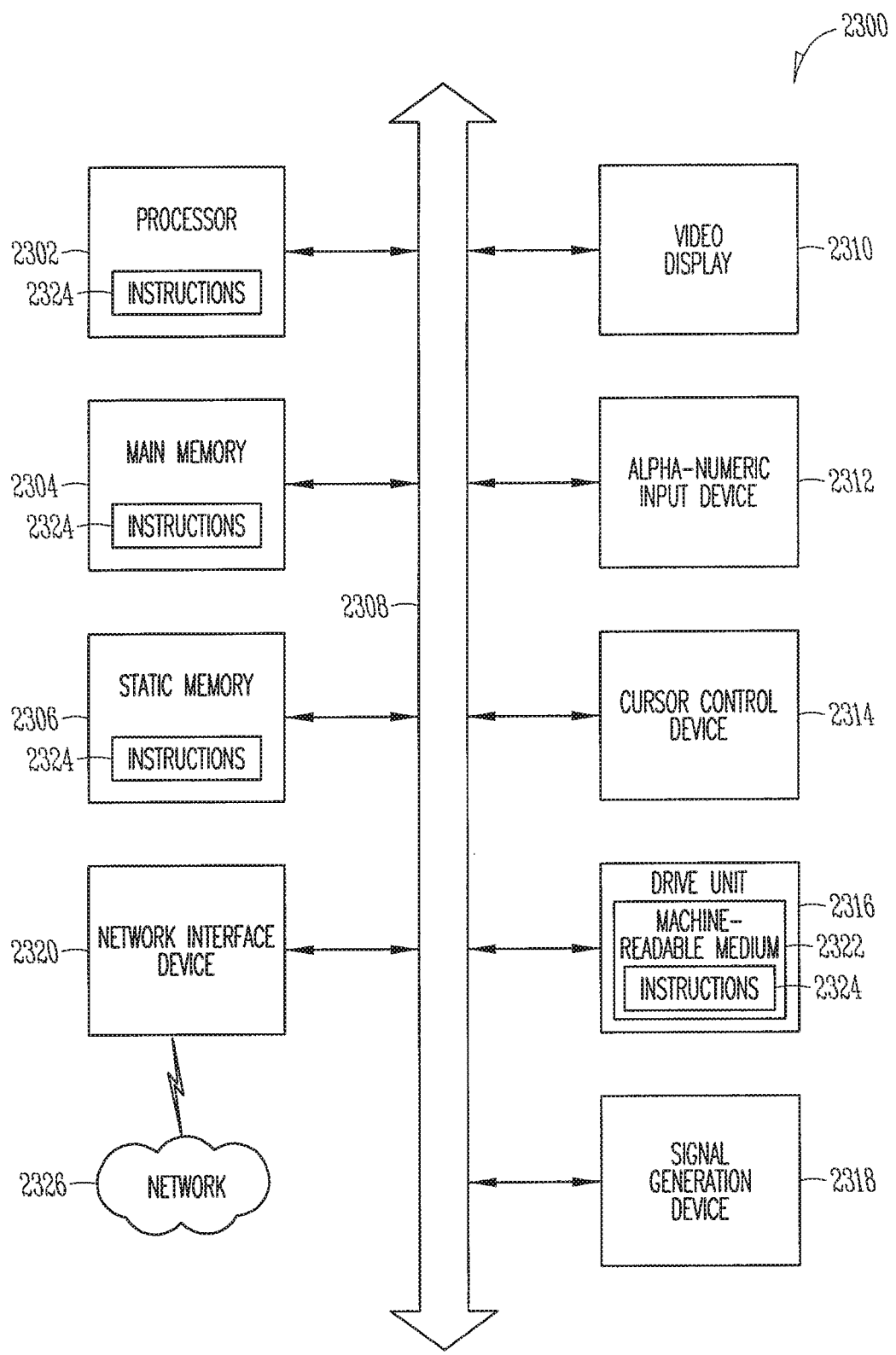
FIG. 9 is a block diagram of machine in the example form of a computer system within which instructions, for causing the machine to perform any one or more of the methodologies discussed herein, may be executed.

FIG. 9 is a block diagram of machine in the example form of a computer system 2300 within which instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU), a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a user interface (UI) navigation device 233 (e.g., a mouse), a disk drive unit 2316, a signal generation device 2318 (e.g., a speaker) and a network interface device 2320.

Machine-Readable Medium

The disk drive unit 2316 includes a machine-readable medium 2322 on which is stored one or more sets of instructions and data structures (e.g., software 2324) embodying or utilized by any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

While the machine-readable medium 2322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 2324 may further be transmitted or received over a communications network 2326 using a transmission medium. The software 2324 may be transmitted using the network interface device 2320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common too many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
receiving, from a first user, a search query for a network-based marketplace;
searching, by a hardware processor and in response to the search query, the network-based marketplace for a plurality of item listings associated with items listed for sale on the network-based marketplace;
displaying a plurality of images representing the items associated with the plurality of item listings on a user interface;
receiving, from the first user, a selection of an image representing an item from the plurality of images displayed on the user interface and an indication of a position on a catalog page display area of the user interface, the image corresponding to an item listing from the plurality of item listings, wherein the catalog page display area represents a catalog page of a multi-page electronic catalog;
in response to the selection and the indication, displaying the image at the position on the catalog page display area of the user interface;
receiving, from the first user based on displaying the image at the position on the catalog page display area of the user interface, an instruction to modify a position, a size, or a shape, of the image within the catalog page of the multi-page electronic catalog;
causing presentation of the catalog page of the multi-page electronic catalog, the causing presentation comprising causing presentation of the image in accordance with the instruction; and
causing presentation of an additional catalog page of the multi-page electronic catalog based at least in part on identifying an instruction to turn a page of the multi-page electronic catalog.

2. The method of claim 1, wherein receiving the indication comprises:
receiving a drag and drop input of the image to the position on the catalog page display area.

3. The method of claim 1, further comprising:
receiving, from the first user, a second selection of a second image representing a second item and a second indication of a second position on the catalog page display area of the user interface;
displaying the second image at the second position on the catalog page display area of the user interface in response to the second selection and the second indication; and
causing presentation of the catalog page comprising the image representing the item and the second image representing the second item.

4. The method of claim 1, further comprising:
removing a second item from the catalog page based on removing a second image representing the second item from the catalog page display area.

5. The method of claim 1, wherein the catalog page comprises an identifier associated with the item listing corresponding to the image, the method further comprising:
receiving a second selection of the image based at least in part on causing presentation of the catalog page; and
causing presentation of the item listing corresponding to the image in response to the second selection and based at least in part on the identifier associated with the item listing.

6. The method of claim 1, further comprising:
recording descriptive information associated with the catalog page, the descriptive information including an identifier of the first user.

7. The method of claim 6, further comprising:
using the descriptive information to credit the first user based on the catalog page being used to perform a transaction, by a second user, for the item associated with the image.

8. A system comprising:
one or more hardware processors; and
a memory device storing instructions that, when executed by the one or more hardware processors, cause the one or more hardware processors to perform operations comprising:
receiving, from a first user, a search query for a network-based marketplace;
searching the network-based marketplace for a plurality of item listings associated with items listed for sale on the network-based marketplace in response to the search query;
displaying a plurality of images representing the items associated with the plurality of item listings on a user interface;
receiving, from the first user, a selection of an image representing an item from the plurality of images displayed on the user interface and an indication of a position on a catalog page display area of the user interface, the image corresponding to an item listing from the plurality of item listings, wherein the catalog page display area represents a catalog page of a multi-page electronic catalog;
in response to the selection and the indication, displaying the image at the position on the catalog page display area of the user interface;
receiving, from the first user based on displaying the image at the position on the catalog page display area of the user interface, an instruction to modify a position, a size, or a shape, of the image within the catalog page of the multi-page electronic catalog;
causing presentation of the catalog page of the multi-page electronic catalog, the causing presentation comprising causing presentation of the image in accordance with the instruction; and
causing presentation of an additional catalog page of the multi-page electronic catalog based at least in part on identifying an instruction to turn a page of the multi-page electronic catalog.

9. The system of claim 8, wherein receiving the indication comprises:
receiving a drag and drop input of the image to the position on the catalog page display area.

10. The system of claim 8, wherein the operations further comprise:
receiving, from the first user, a second selection of a second image representing a second item and a second indication of a second position on the catalog page display area of the user interface;
displaying the second image at the second position on the catalog page display area of the user interface in response to the second selection and the second indication; and causing presentation of the catalog page comprising the image representing the item and the second image representing the second item.

11. The system of claim 8, wherein the operations further comprise:
removing a second item from the catalog page based on removing a second image representing the second item from the catalog page display area.

12. The system of claim 8, wherein the operations further comprise:
resizing the image on the catalog page based on the instruction, the instruction indicating a resizing of the image in the catalog page display area.

13. The system of claim 8, wherein the operations further comprise:
recording descriptive information associated with the catalog page, the descriptive information including an identifier of the first user.

14. The system of claim 13, wherein the operations further comprise:
using the descriptive information to credit the first user based on the catalog page being used to perform a transaction, by a second user, for the item associated with the image.

15. A non-transitory machine-readable storage medium comprising instructions, which when executed by a machine, cause the machine to perform operations comprising:
receiving, from a first user, a search query for a network-based marketplace;
searching the network-based marketplace for a plurality of item listings associated with items listed for sale on the network-based marketplace in response to the search query;
displaying a plurality of images representing the items associated with the plurality of item listings on a user interface;
receiving, from the first user, a selection of an image representing an item from the plurality of images displayed on the user interface and an indication of a position on a catalog page display area of the user interface, the image corresponding to an item listing from the plurality of item listings, wherein the catalog page display area represents a catalog page of a multi-page electronic catalog;
in response to the selection and the indication, displaying the image at the position on the catalog page display area of the user interface;
receiving, from the first user based on displaying the image at the position on the catalog page display area of the user interface, an instruction to modify a position, a size, or a shape, of the image within the catalog page of the multi-page electronic catalog;
causing presentation of the catalog page of the multi-page electronic catalog, the causing presentation comprising causing presentation of the image at the position on the catalog page in accordance with the instruction; and
causing presentation of an additional catalog page of the multi-page electronic catalog based at least in part on identifying an instruction to turn a page of the multi-page electronic catalog.

16. The non-transitory machine-readable storage medium of claim 15, wherein receiving the indication comprises:
receiving a drag and drop input of the image to the position on the catalog page display area.

17. The non-transitory machine-readable storage medium of claim 15, wherein the operations further comprise:
receiving, from the first user, a second selection of a second image representing a second item and a second indication of a second position on the catalog page display area of the user interface;
displaying the second image at the second position on the catalog page display area of the user interface in response to the second selection and the second indication; and
causing presentation of the catalog page comprising the image representing the item and the second image representing the second item.

18. The non-transitory machine-readable storage medium of claim 15, wherein the operations further comprise:
removing a second item from the catalog page based on removing a second image representing the second item from the catalog page display area.

* * * * *